Oct. 12, 1965
A. Q. COTTERMAN
3,211,887
WELDING SHOE
Filed June 14, 1962
2 Sheets-Sheet 1
Fig. I.
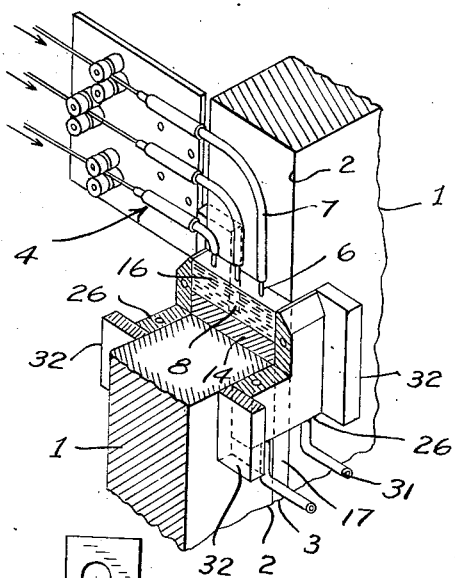
Fig. II.
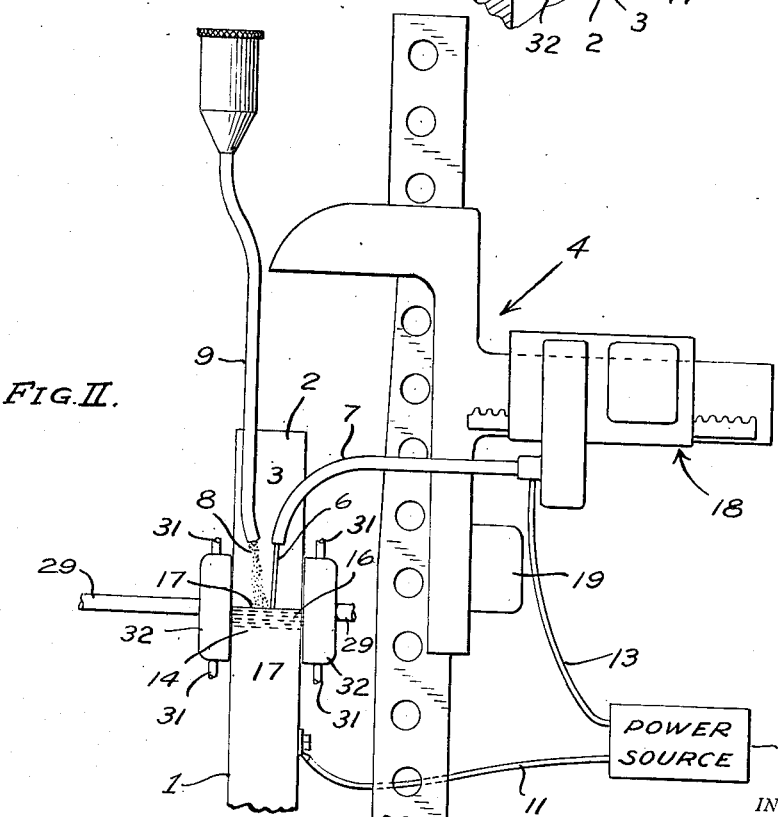
INVENTOR.
ALMON Q. COTTERMAN
BY *Charles E. Baxley*
ATTORNEY Oct. 12, 1965 A. Q. COTTERMAN 3,211,887
WELDING SHOE
Filed June 14, 1962
2 Sheets-Sheet 2
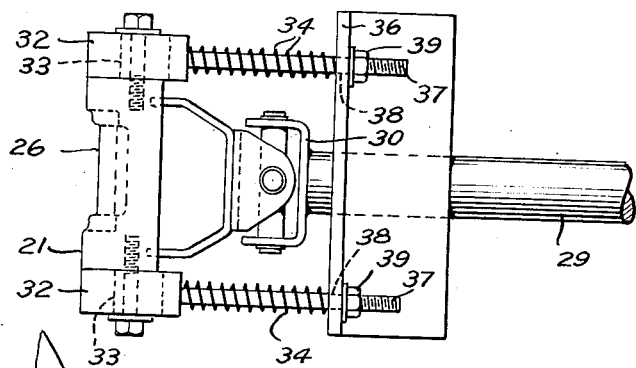
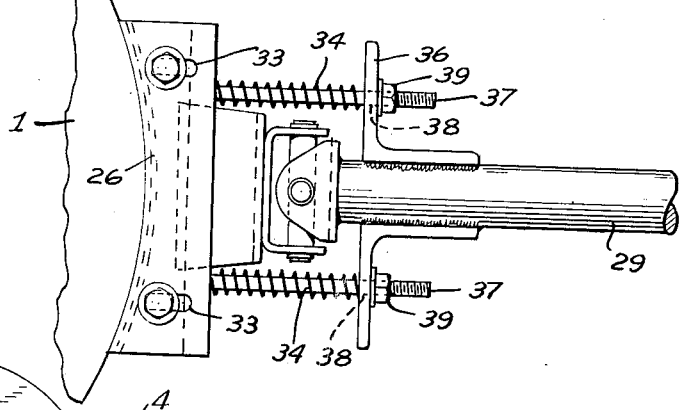
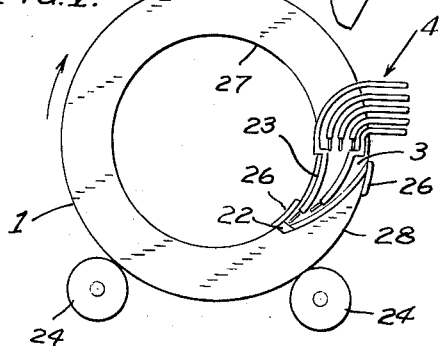
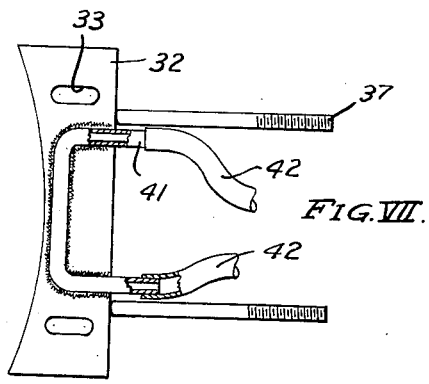
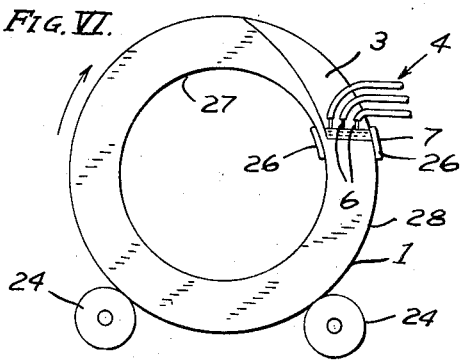
INVENTOR.
ALMON Q. COTTERMAN
BY Charles E. Bixby
ATTORNEY United States Patent Office 3,211,887
Patented Oct. 12, 1965

3,211,887
WELDING SHOE
Almon Q. Cotterman, Stillwater, Pa., assignor to Foster Wheeler Corporation, New York, N.Y., a corporation of New York
Filed June 14, 1962, Ser. No. 202,408
17 Claims. (Cl. 219—126)

This invention relates to welding processes such as electroslag welding wherein a molten pool is developed and maintained. The invention is a pool confining device particularly useful for uneven or curved pieces.

Electroslag welding is a continuous process. Current passes from at least one consumable electrode through a molten flux pool to work pieces being welded. Heat is generated by current passing through the flux. Melting coalesces the electrode and adjacent parent metal. Coalesced weld metal gravitates to the bottom of the pool where it cools to form the weld. The flux remains molten as it progresses continuously up a seam. Because electroslag welding is a one pass process it is especially valuable for butt welds ranging in thickness from two inches to about twelve inches.

Development and control of a molten pool is essential to the electroslag process. A molten pool from one inch to one and one-half inches deep is usual. Vertical welding simplifies confinement of the molten pool. After start up, the bottom of the pool is defined by the completed weld. Pool sides are provided by the work pieces. Shoes are generally pressed against the work pieces to form dams which confine pool ends and shape the weld. To maintain pool confinement it is important that the shoes remain in contact with the work pieces. Rolling tolerances and rough surfaces have occasioned difficulties in pool confinement, especially with curved work pieces. When discontinuity is encountered, a spring loaded shoe loses contact with one of the work pieces causing leakage of the molten pool. At such an occurrence it is necessary to stop and relocate the shoes. Stoppage causes defective welds.

The present invention accommodates discontinuities between work pieces without leakage of the molten pool. More particularly this advance includes at least one side plate connected in sealing engagement with a welding shoe. Relative movement between the side plate and the shoe is accommodated. Thrust is provided to keep the side plate in slidable engagement with the work piece so that it will retain the molten pool in the event the work piece becomes separated from the shoe.

This advance extends electroslag welding to uneven and curved work pieces. Butt welding of cylinders end to end is made commercially feasible. Savings of time and material accrue and the resulting weld is improved.

These and other advantages will appear more fully from the accompanying drawings wherein:

FIGURE I is a fragmentary sectional isometric view of an electroslag welding set up with welding shoes embodying the present invention.

FIGURE II is an idealized schematic representation of the essential feature of electroslag welding.

FIGURE III is a top view of a welding shoe according to this invention.

FIGURE IV is a side view of the shoe depicted in FIGURE III.

FIGURE V is a sectional view along a cylindrical weld illustrating start up.

FIGURE VI is a sectional view along a cylindrical weld illustrating the finish of the weld.

FIGURE VII depicts a side plate with a water cooling tube attached thereto.

In the drawings work pieces 1 have edges 2 which are spaced apart to define gap 3 therebetween. The work pieces may be planar as shown in FIGURES I and II or they may be continuously curved as shown in FIGURES V and VI.

As best seen in FIGURES I and II, electroslag welding machine generally designated 4 develops a pool of molten slag in gap 3. Consumable electrodes 6 are continuously fed into gap 3 through electrode guides 7. As shown in FIGURE II, flux 8 may be admitted in granular form through flux conduit 9. Electric lead 11 is connected between work pieces 1 and power source 12. Electric lead 13 is connected between power source 12 and consumable electrodes 6. Passage of current between consumable electrode 6 and work pieces 1 via flux 8 generates welding heat. Molten weld metal 14 settles out of molten pool 16 to cool, thereby forming completed weld 17. Welding voltage is usually maintained in the range from forty-five to fifty-five volts. The depth of molten pool 16 is controlled by adjusting the voltage or current or both.

As shown in FIGURE II lateral drive mechanism 18 moves electrode 6 in a back and forth motion. The stirring action thus provided distributes heat uniformly to the molten pool. The deposition rate is generally thirty-five pounds per hour. In very heavy plates for which at least three electrodes are used, deposition rates of one-hundred to one-hundred-thirty-five pounds and up are not uncommon. To fill a gap of one inch with work pieces ranging from three to twelve inches in thickness, welding speeds from two to four feet per hour are used. About five pounds of flux are consumed for each one-hundred pounds of weld metal.

Electroslag welding machies 4 are equipped with vertical drive mechanisms 19 to move automatically up a vertical seal as weld is deposited. For curved sections as shown in FIGURES V and VI, welding machine 4 is stationarily mounted while the work pieces are rotated or otherwise moved in unison to offer a continuous upright gap 3 to welding machine 4.

During normal operations, control of an electroslag welding machine is sensed by two probes known to the welding art and generally located in shoe faces. One probe actuates upward movement as weld metal is deposited. Another probe generally senses flux requirements. Use of flux cored wire instead of granular flux is available to simplify flux feeding.

Arcuate or circular welds are more involved than vertical welds. As shown in FIGURE V, when starting a circular weld; starting shoe 21, consumable starting block 22 and consumable wire guide 23 are employed. Work pieces 1 are positioned on turning rollers 24. Shoes 26 are machined to complement inside contour 27 and outside contour 28 respectively. At the start the work is stationary until the pool level reaches consumable electrodes 6. Then the welding proceeds with the work pieces turning clockwise and welding machine 4 stationary. FIGURE VI teaches the procedure nearing the finish of the weld. Machine 4 rises out to finish the weld.

Holding booms 29 press welding shoes 26 against work piece 1 becomes separated from a welding shoe 26. As best seen in FIGURES III and IV, side plate 32 are 26 are generally made of copper and are water cooled. Water is delivered to the shoes via conduits 31.

Side plates 32 serve as seals in the event one of the work pieces 1 becomes separated from a welding shoe 26. As best seen in FIGURES III and IV, side plates 32 mounted in sliding engagement with shoe 26. Elongated slots 33 accommodate relative movement between side plates 32 and shoes 26. To maintain side plates 32 in sliding contact with work pieces 1, thrust means shown or springs 34 are provided.

The thrust means are connected between side plates 32 and holding booms 29. Springs 34 with spiral configurations abut between side plates 32 and flanges 36. Bolts 37 are connected to side plates 32 and penetrate through bolt holes 38. Nuts 39 screw onto bolts 37 to bear flanges 36 onto springs 45 thereby imparting desired compression to the resilient thrust means.

A water cooled side plate is shown in FIGURE VII. Tube 41 defines a cooling passage and is connected via flexible conduit 42 to a suitable means for circulating cooling fluid.

It will be apparent that wide changes may be made in the shown embodiment wtihout departing from the spirit of invention defined by the claims.

What is claimed is:

1. A seal for preventing the escape of a molten pool on the separation of a work piece from a welding shoe with the work piece movable relative the shoe comprising
   a welded shoe,
   a side plate connected in sealing engagement with the shoe,
   means for accommodating relative movement between the side plate and the shoe,
   a thrust means connected to the side plate to maintain it in slidable contact with the work piece.

2. The seal of claim 1 with the thrust means including at least one spring, holding means connected to said shoe, said spring being connected between said holding means and the side plate.

3. The seal of claim 2
   with the side plates including at least one cooling passage,
   means for circulating cooling fluid through the cooling passage.

4. The seal of claim 3
   with the shoe supported from a boom,
   a flange depending from the boom and defining a bolt hole,
   the spring defining a spiral configuration and abutted between the side plate and the flange,
   a bolt mounted interiorly of the spring,
   the bolt connected to the side plate and penetrating through the bolt hole,
   a nut screwable onto the bolt to bear the flange onto the spring thereby imparting a desired strain to the spring.

5. A device for spanning one end of a vertical gap between workpieces to confine a molten pool therein and comprising a shoe,
   the work pieces movable in unison relative the shoe,
   press means for pressing the shoe simultaneously against at least two work pieces for sliding engagemment therewith,
   at least one vertically disposed side plate connected in sealing engagement with the shoe,
   means for accommodating relative movement between the side plate and the shoe,
   the work pieces including a first work piece,
   a thrust means connected to the side plate to maintain it in slidable contact with the first work piece whereby the molten pool is confined by the side plate in the event the first work piece becomes separated from the shoe.

6. The device of claim 5 with the thrust means including at least one spring connected between the press means and the side plate.

7. The device of claim 6
   with the plate including at least one cooling passage.
   means for circulating cooling fluid through the cooling passage.

8. The device of claim 7
   with the press means including a boom,
   the shoe supported from the boom,
   a flange depending from the boom and defining a bolt hole,
   the spring defining a spiral configuration and abutted between the side plate and the flange,
   a bolt mounted interiorly of the spring,
   the bolt connected to the side plate and penetrating through the bolt hole,
   a nut screwable onto the bolt to bear the flange onto the spring thereby imparting a desired strain to the spring.

9. In the combination
   including a pair of work pieces each having an edge,
   with the edges disposed in proximity with each other and spaced apart to define a gap therebetween,
   with welding means for developing a molten pool in the gap,
   with means for providing relative movement between the welding means and the work pieces so that the welding means travels along the gap,
   with at least one shoe mounted on one side of both work pieces,
   with the shoe engageable in contact with both of the work pieces spanning the gap at one end of the molten pool to confine the molten pool,
   with press means for pressing the shoe simultaneously against both work pieces;
   the inclusion in this combination of an improvement comprising at least one vertically disposed side plate connected in sealing engagement with the shoe,
   means for accommodating movement between the side plate and the shoe,
   the work pieces including a first work piece,
   a thrust means connected to the side plate to maintain it in slidable contact with the first work piece whereby the molten pool is confined by the side plate in the event the first work piece becomes separated from the shoe.

10. The combination of claim 9
   with the side plate including at least one cooling pas-
   means for circulating cooling fluid through the cooling passage,
   the press means including a boom,
   the shoe supported from the boom,
   a flange depending from the boom and defining a bolt hole,
   the thrust means including a spring with a spiral configuration abutted between the side plate and the flange,
   a bolt mounted interiorly of the spring,
   the bolt connected to the side plate and penetrating through the bolt hole,
   a nut screwable onto the bolt to bear the flange onto the spring thereby imparting a desired strain to the spring.

11. In the combination
   including a pair of work pieces each having a similar continuously curved edge,
   with the edges disposed in proximity with each other and spaced apart to define a gap therebetween,
   with electroslag welding means for developing a pool of molten slag in the gap,
   with means for continuously moving the work pieces so that they pass in unison vertically downward past the welding means so that the welding means travels the length of the gap,
   with at least one shoe mounted on the same side of both work pieces,
   with the shoe shaped complementary to the curvature of the work pieces and engageable in sliding surface contact with both of the work pieces spanning the gap at one end of the molten pool, to confine the molten pool,
   with press means for pressing the shoe simultaneously against both work pieces;
   the inclusion in the combination of an improvement comprising at least one vertically disposed side plate connected in sealing engagement with the shoe, means for accommodating movement between the side plate and the shoe,
the work pieces including a first work piece,
the side plate shaped to complement the curvature of the first work piece,
a thrust means connected to the side plate to maintain it in slidable contact with the first work piece whereby the molten pool is confined by the side plate in the event the first work piece becomes separated from the shoe.

12. The combination of claim 11
with the side plate including at least one cooling passage,
means for circulating cooling fluid through the cooling passage,
the press means including a boom,
the shoe supported from the boom,
a flange depending from the boom and defining a bolt hole,
the thrust means including a spring with a spiral configuration abutted between the side plate and the flange,
a bolt mounted interiorly of the spring,
the bolt connected to the side plate and penetrating through the bolt hole,
a nut screwable onto the bolt to bear the flange onto the spring thereby importing a desired strain to the spring.

13. In vertical welding mechanism, a welding shoe combination, comprising an intermediate shoe, means for supporting the intermediate shoe, wing shoes on either side of the intermediate shoe, guide means permitting the wing shoes to move relatively toward and away from the work and permitting the forward faces of the wing shoes to rock about a horizontal axis with respect to the vertical, resilient means for urging the top of each wing shoe toward the work and resilient means urging the bottom of each wing shoe toward the work.

14. Mechanism of claim 13, in which the resilient means for urging the top of each wing shoe toward the work comprises a helical compression spring and the resilient means for urging the bottom of each wing shoe toward the work comprises a helical compression spring.

15. Mechanism of claim 13, in which said guide means comprises a bolt and slot connected between each wing shoe and said intermediate shoe.

16. Mechanism of claim 13, in which said means for supporting said intermediate shoe comprises vertical pivot means interposed between said resilient means, and permitting all shoes together to swing on said vertical pivot means.

17. Mechanism of claim 14, in which said resilient means comprise arm means, means pivotally connecting said arm means intermediate their ends to said means for supporting said intermediate shoe horizontal pivoting movement of the arm means, said arm means connecting to said springs at their ends.

References Cited by the Examiner

UNITED STATES PATENTS

| | | | |
|---|---|---|---|
| 2,997,571 | 8/61 | Smout | 219—126 |
| 3,046,386 | 7/62 | Wooding et al. | 219—126 |

RICHARD M. WOOD, *Primary Examiner.*

JOSEPH V. TRUHE, *Examiner.*

UNITED STATES PATENT OFFICE
CERTIFICATE OF CORRECTION

Patent No. 3,211,887                                October 12, 1965

Almon Q. Cotterman

It is hereby certified that error appears in the above numbered patent requiring correction and that the said Letters Patent should read as corrected below.

Column 2, lines 61 and 62, strike out "work piece 1 becomes separated from a welding shoe 26. As best seen in FIGURES III and IV, side plate 32 are" and insert instead -- work pieces 1 to confine molten pool 16. Universal couplings 30 secure shoes 26 to booms 29. Welding shoes --; column 3, line 48, for "workpieces" read -- work pieces --; line 68, after "with the" insert -- side --; column 4, line 37, for "pas-" read -- passage, --.

Signed and sealed this 14th day of June 1966.

(SEAL)
Attest:

ERNEST W. SWIDER                           EDWARD J. BRENNER
Attesting Officer                               Commissioner of Patents